United States Patent [19]
Bai et al.

[11] Patent Number: 5,574,353
[45] Date of Patent: Nov. 12, 1996

[54] ELECTROCHEMICAL CHARGE STORAGE DEVICE HAVING CONSTANT VOLTAGE DISCHARGE

[75] Inventors: Lijun Bai, Vernon Hills, Canada; Ke K. Lian, Northbrook, Ill.; Robert E. Stengel, Pompano Beach, Fla.

[73] Assignee: Motorola, Inc., Schaumburg, Ill.

[21] Appl. No.: 414,816

[22] Filed: Mar. 31, 1995

[51] Int. Cl.$^6$ .................................................. H01M 10/46
[52] U.S. Cl. .................................. 320/14; 320/21; 320/1
[58] Field of Search .................... 320/5, 1, 9, 8, 320/12, 13, 14, 20, 21, 30, 35, 39, 48; 324/432; 429/90, 222, 223

[56] References Cited

U.S. PATENT DOCUMENTS

| | | | |
|---|---|---|---|
| 5,334,226 | 8/1994 | Furukawa | 320/14 X |
| 5,368,961 | 11/1994 | Juergens . | |
| 5,436,549 | 7/1995 | Lundquist et al. | 320/13 |
| 5,500,583 | 3/1996 | Buckley et al. | 320/21 X |

*Primary Examiner*—Edward H. Tso
*Attorney, Agent, or Firm*—Kenneth M. Massaroni

[57] ABSTRACT

An electrochemical charge storage device (20) having a voltage discharge profile which is constant for a substantial period of the discharge cycle, which then drops off sharply to full discharge, in a manner more often associated with a battery discharge profile. The electrochemical charge storage device is further characterized by a discharge rate in excess of at least 100 C., and as much as 7000 C. Accordingly, the electrochemical charge storage device is characterized by a battery discharge voltage profile which occurs at substantially capacitor discharge rates.

16 Claims, 7 Drawing Sheets

5,574,353

ELECTROCHEMICAL CHARGE STORAGE DEVICE HAVING CONSTANT VOLTAGE DISCHARGE

TECHNICAL FIELD

This invention relates in general to electrochemical charge storage devices, and more particularly to electrochemical charge storage devices which have constant voltage discharge profiles.

BACKGROUND

Electrochemical capacitors are a class of high-rate energy storage/discharge devices which use electrolytes and electrodes of various kinds. Electrochemical capacitors, like batteries, are essentially energy storage devices. However, unlike batteries, they rely on charge accumulation at the electrode/electrolyte interface to store energy. Charge storage in electrochemical capacitors therefore is a surface phenomenon. Conversely, charge storage in batteries is a bulk phenomenon occurring within the bulk of the electrode material. As a result of the differences in the charge/discharge mechanism, and selection of electrode materials between capacitors and batteries, the discharge profiles and discharge rates of the two devices are radically different.

For most battery systems voltage discharge profiles are typically flat for the major portion of the discharge cycle. Once a predetermined end-of-life voltage is reached, the voltage profile drops abruptly to zero. An example of a typical battery discharge voltage profile of the prior art is illustrated in FIG. 1, wherein discharge voltage is illustrated on the ordinate, and discharge time is illustrated on the abscissa, and which shows that the discharge voltage, line 12, remains substantially constant for a substantial period of the overall discharge cycle, dropping off rapidly to zero near the end of the discharge cycle. The advantage of the profile illustrated in FIG. 1 is that it is able to deliver a constant voltage for a prolonged period of time.

Conversely, capacitors such as conventional electrolytic and/or double layer capacitors, have the capability to deliver their stored energy very rapidly, i.e., in less than one second. This capability is necessary for delivering the brief bursts of energy required of certain applications, such as when a portable radio or cellular telephone is transmitting. The discharge rate is known as the "C" rate, and is an industry standard for stored energy discharge speed. A 1.0 C rate refers to the ability of a device to discharge its stored energy in one hour. A 10 C rate refers to a device capable of discharging its stored energy into a load in 6 minutes, and a 100 C rate device discharges its stored energy into a load in 0.6 minutes.

Unfortunately, while the discharge is very rapid, the discharge profile is linearly decreasing with time. Hence the highest discharge voltage occurs at the moment discharge starts, and degrades rapidly from there. The voltage discharge profile of a capacitor device of the prior art is illustrated in FIG. 2 wherein voltage is illustrated on the ordinate, and time is illustrated on the abscissa, and wherein the discharge profile is illustrated by line 14. As may be appreciated from FIG. 2, the discharge voltage is linearly decreasing with time. Hence, if a particular voltage is required, such as a voltage in excess of 19 volts, only a small fraction of the discharge cycle is actually used by the host device. Thus, only the stored energy defined by block 16 is usable to the host device; the rest remains stored and is inaccessible.

Accordingly, there exists a need for an electrochemical device capable of delivering a constant voltage discharge for a substantial portion of the discharge cycle. Moreover, in order to address the high pulse power requirements of many host devices, the total discharge cycle should be extremely fast, i.e., on the order of or in excess of a 100 C rate.

DETAILED DESCRIPTION OF THE PREFERRED EMBODIMENT

Figure 1:
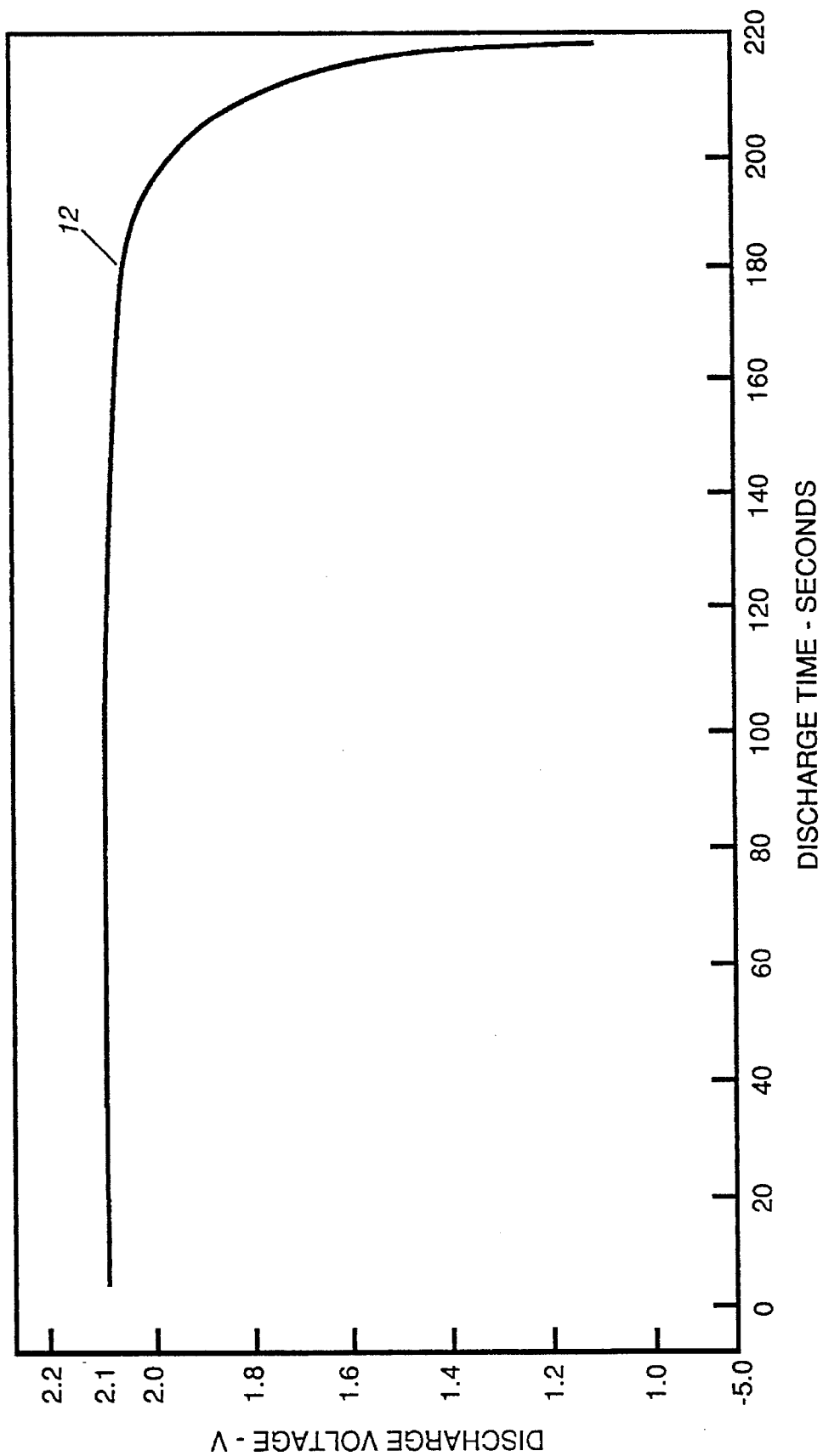
FIG. 1 is a graph illustrating the voltage discharge profile of a conventional battery of the prior art.
Figure 2:
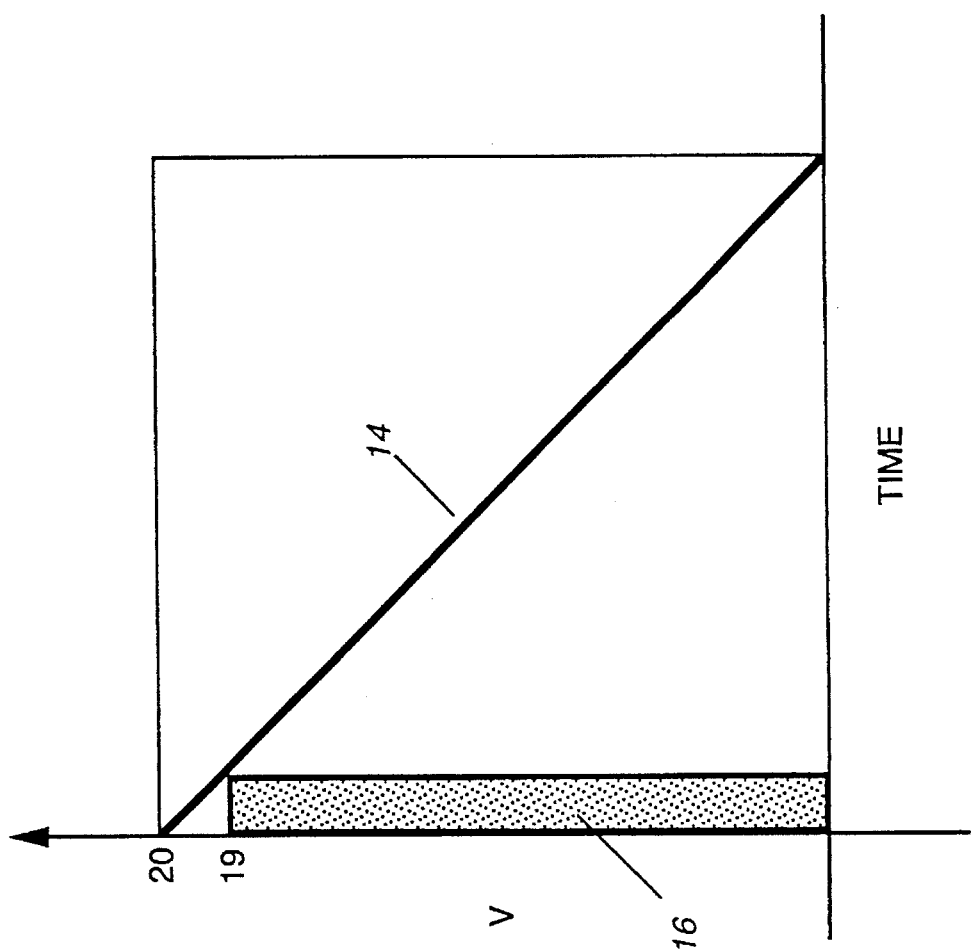
FIG. 2 is a graph illustrating the voltage discharge profile of a conventional electrolytic or double layer capacitor device of the prior art.

While the specification concludes with claims defining the features of the invention that are regarded as novel, it is believed that the invention will be better understood from a consideration of the following description in conjunction with the drawing figures, in which like reference numerals are carried forward.

Figure 3:
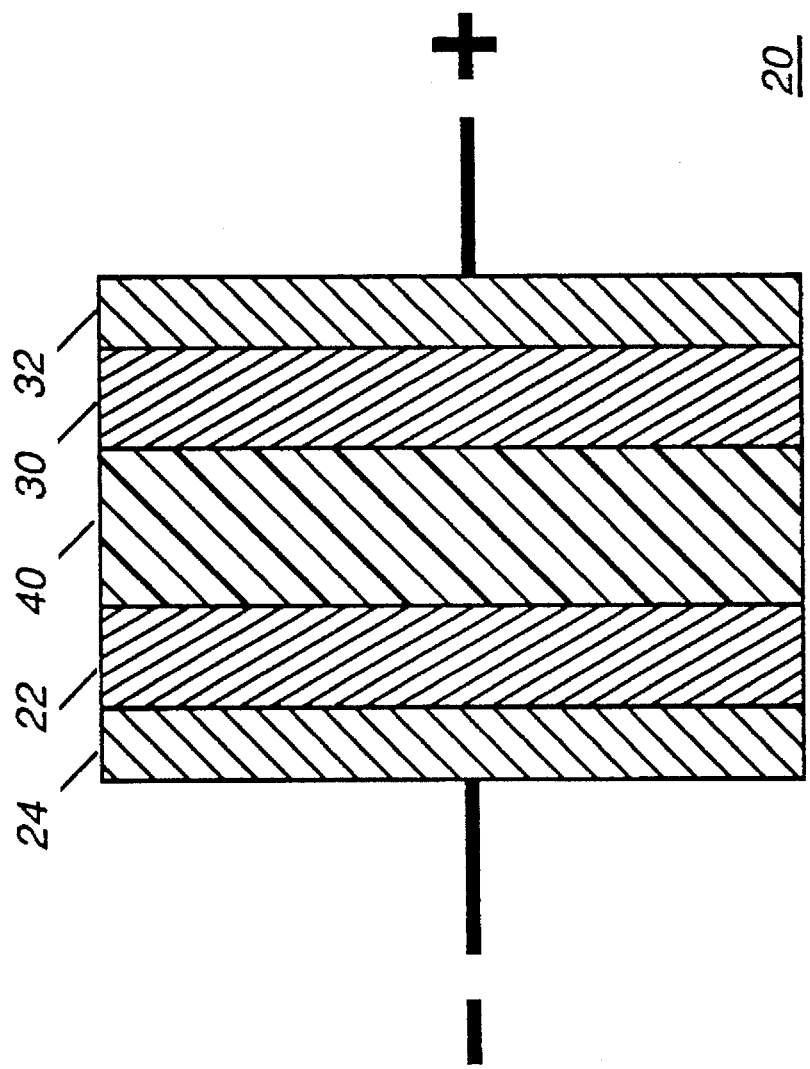
FIG. 3 is a schematic representation of an electrochemical charge storage device in accordance with the instant invention.

Referring now to FIG. 3, there is illustrated therein a schematic representation of an electrochemical charge storage device 20 in accordance with the instant invention. The electrochemical charge storage device 20 includes an anode 22 deposited on a first current carrying substrate 24. The substrate may be fabricated of, for example, nickel, aluminum, graphite, copper, stainless steel, and combination thereof. The anode 22 may itself be fabricated of any of a number of materials which demonstrate a flat voltage discharge profile, and which are capable of discharging energy stored therein very rapidly. Examples of preferred anode material include bismuth, antimony, bismuth:antimony alloys, zinc, zinc alloys, cadmium, lead, and combinations thereof. In one preferred embodiment, the anode is fabricated of a bismuth:antimony alloy such as that disclosed in commonly assigned, co-pending U.S. patent application Ser. No. 08/358,294 filed Dec. 15, 1994 in the names of Li, et al, the disclosure of which is incorporated herein by reference. The anode material may be deposited by any of a number of known processes, and should be deposited on the surface of the substrate to a thickness of less than about 10 μm and preferably less than about 1 μm. The thickness of such electrodes may be as thin as 0.001 μm.

The electrochemical charge storage device 20 further includes a cathode 30 disposed on a second current carrying substrate 32. The substrate 32 is fabricated of a material as described hereinabove with respect to substrate 24. The cathode 30 may be fabricated of any of a number of materials which demonstrate a flat voltage discharge profile, and which is capable of discharging energy stored therein very rapidly. Examples of preferred cathode materials include lead, nickel, silver, nickel-molybdenum-chromium alloys, copper, and combinations thereof. In one preferred embodiment, the cathode is fabricated of a nickel-molybdenum-chromium alloy such as that disclosed in commonly assigned, co-pending U.S. patent application Ser. No. 08/322,130 filed Oct. 13, 1994, in the names of Ke Keryn Lian and Lijun Bai, the disclosure of which is incorporated herein by reference. The cathode material may be deposited by any of a number of known processes, and should be deposited on the surface of the substrate to a thickness of less than about 10 μm and preferably less than about 1 μm. The thickness of such electrodes may be as thin as 0.001 μm. According to industry convention the cathode is defined as the positive electrode and the anode as the negative electrode during the discharge process. The roles are reversed during the charging process. Thus, references herein to the "cathode" refer to the electrode serving as the cathode during discharge. Similarly, references herein to the "anode" refer to the electrode serving as the anode during discharge.

The electrochemical charge storage device may further include an electrolyte/separator 40 operatively disposed between the anode and the cathode. The electrolyte illustrated in FIG. 3 is an aqueous electrolyte held into a separator material in a fashion known in the art. It is to be understood however that while the invention is illustrated herein with a aqueous electrolyte, it may be employed with equal advantage to non-aqueous or solid state systems. The electrolyte used in connection with the electrochemical capacitor device in accordance with the invention may be any aqueous electrolyte, such as an alkaline electrolyte, a neutral electrolyte, or an acid electrolyte. In one preferred embodiment, the electrolyte is a 31% KOH solution. Similarly the separator may be fabricated of a number of known separator materials as are practiced in the art. Specific examples of such separators includes, but are not limited to, porous cellulose, porous silica, glass wool, glass fiber, polypropylene, and combinations thereof.

A unique aspect of the electrochemical charge storage device in accordance with the instant invention is its ability to provide a battery-like voltage discharge profile, while rapidly discharging the energy stored therein. Specifically, the discharge profile of the electrochemical charge storage device provides a substantially constant voltage discharge profile, in constant current discharge conditions, for at least a substantial portion of the discharge cycle, i.e., at least 80% of the discharge cycle. As the discharge cycle reaches the end of the stored energy, the voltage drops rapidly off to zero. This discharge profile will allow for a much higher utilization efficiency of the device than is available in conventional capacitors. This is because only a small fraction of a conventional capacitor's stored energy is usable since the voltage drop in such devices is linearly decreasing with time. Accordingly, once the conventional capacitor device's voltage drops below the voltage required, the balance of the stored energy is inaccessible to the desired load.

Another unique aspect of the electrochemical charge storage device is its ability to discharge its stored energy at very high discharge rates. As used herein, high rates refers to rates in excess of 100 C, and preferably in excess of 1000 C. As may be appreciated from a perusal of the examples provided below, discharge rates for electrochemical charge storage devices in accordance with the instant invention typically exceed 3000 C. As a result, the power density of the device is much higher than that of a conventional battery.

The invention is further discussed by offering specific examples of the electrochemical charge storage device.

EXAMPLES

Example I

Figure 4:
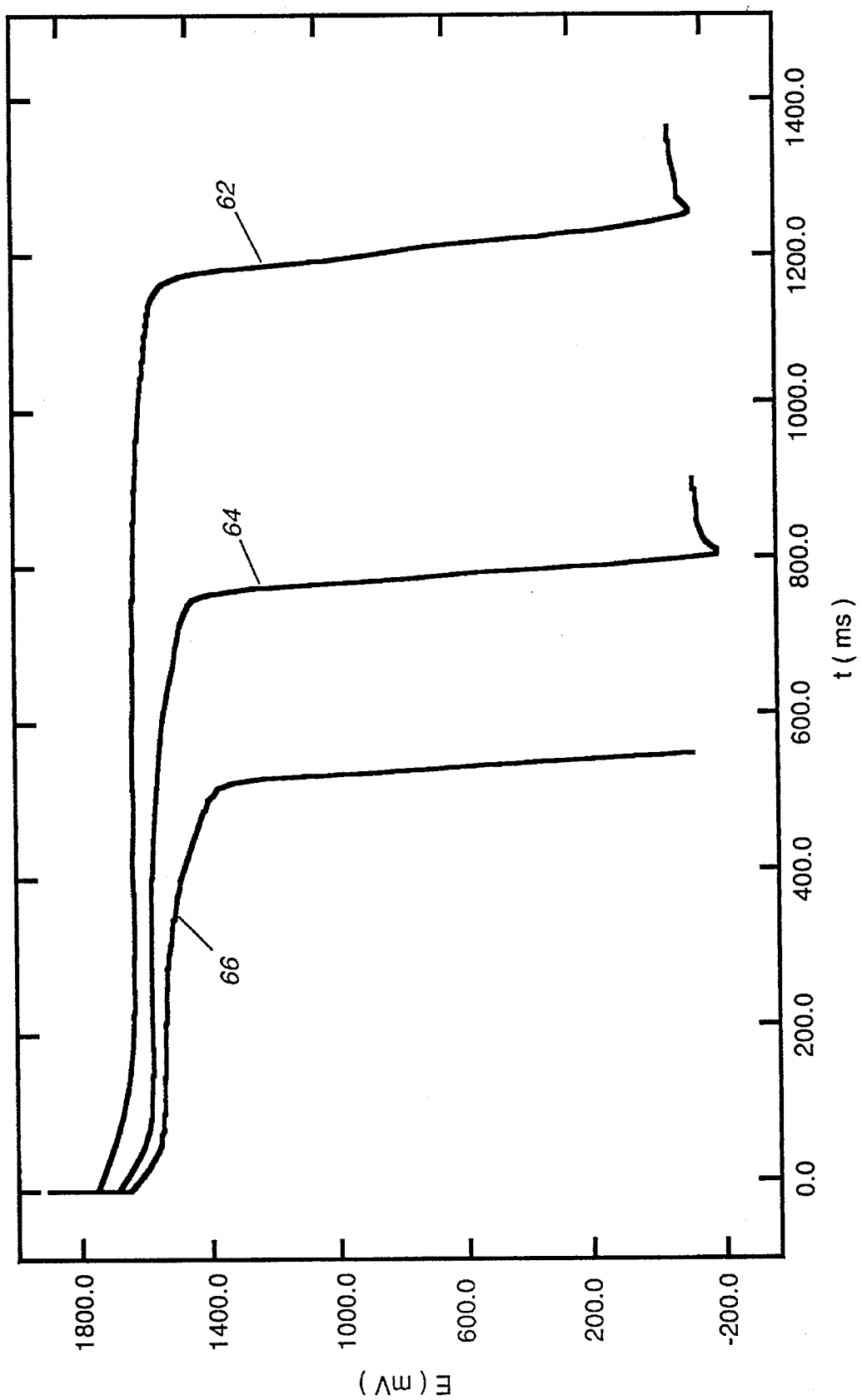
FIG. 4 is a discharge profile for an electrochemical charge storage device in accordance with the instant invention.

Referring now to FIG. 4, there is illustrated therein the discharge curves for a charge storage device in accordance with the instant invention. The charge storage device was fabricated of a nickel-molybdenum-chromium alloy cathode or positive electrode, which was treated in a 30% KOH solution and polarized. An oxide active material film formed on the nickel-molybdenum-chromium alloy, having a thickness of about 0.20 μm. The anode or negative electrode was fabricated of a zinc metal foil which was treated in a 30% KOH solution and polarized. An oxide active material film formed on the zinc metal foil having a thickness of about 0.5 μm. The electrodes were then immersed in an electrolyte solution of 30% KOH, and discharged at various constant discharge currents by means of a potentiostat. As may be appreciated from a perusal of FIG. 4, the discharge profile of the electrode evaluated therein is substantially constant over the majority of the discharge cycle's duration, at all tested current levels. Further the discharge rates for each test are at or in excess of 3000 C.

Specifically, the discharge curve for the charge storage device tested at a constant discharge current of 0.1 A/cm$^2$ (ampere hours per square centimeter) is illustrated by line 62, and shows a very flat, constant voltage discharge for a discharge period of 1.2 seconds, corresponding to a C rate of about 3000 C. The discharge curve for the charge storage device tested at a constant discharge current of 0.15 A/cm$^2$ is illustrated by line 64, shows a substantially constant voltage discharge for an 800 millisecond discharge period corresponding to a C rate of about 4500 C. Finally, the discharge curve for the charge storage device tested at a constant discharge current of 0.20 A/cm$^2$ is illustrated by line 66, and shows a constant voltage discharge for a period of approximately 600 milliseconds, corresponding to a C rate of about 6500 C.

Figure 5:
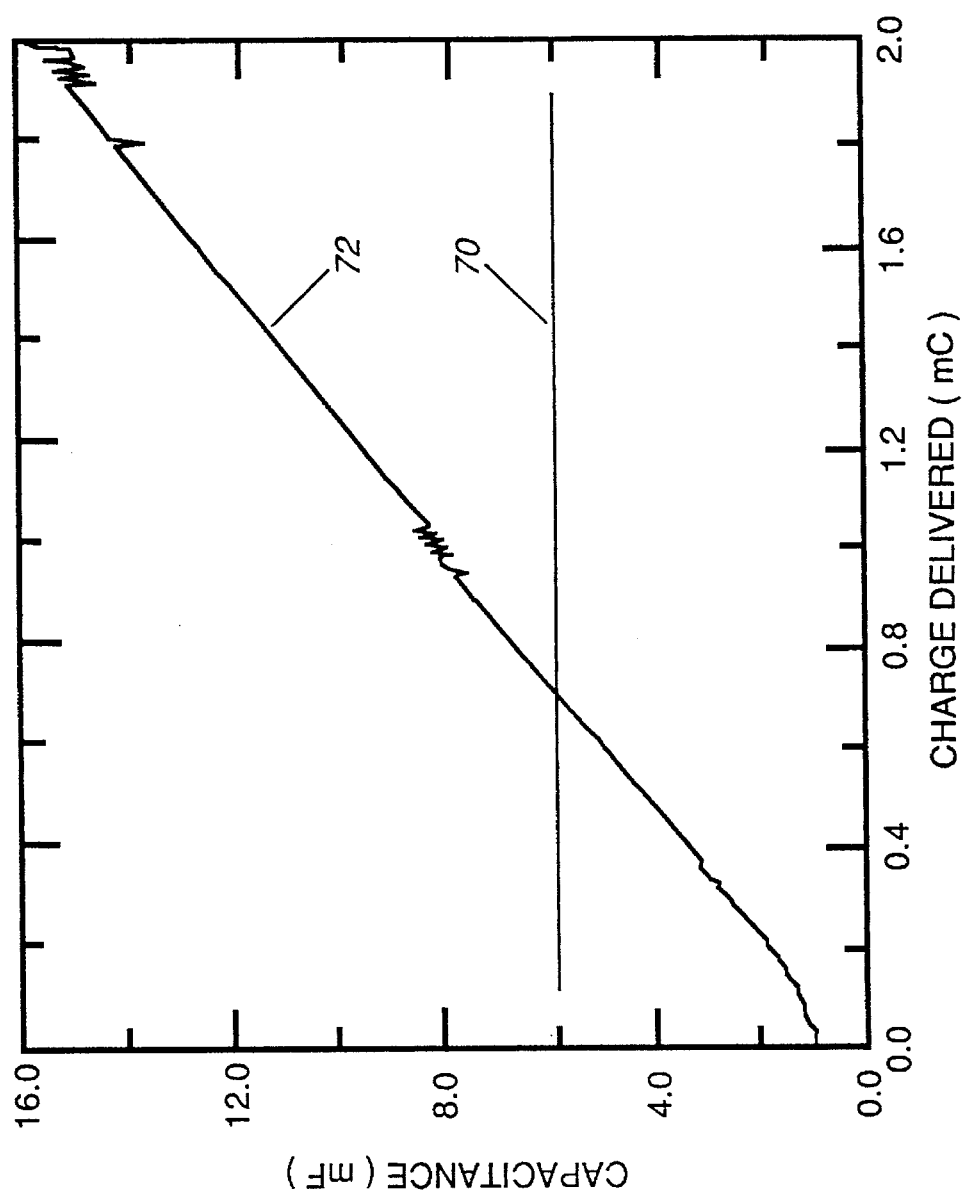
FIG. 5 is a plot of experimental capacitance versus charge for an electrochemical charge storage device in accordance with the instant invention.

Referring now to FIG. 5, there is illustrated therein a plot of experimental capacitance versus stored charge for a charge storage device having a nickel-molybdenum-chromium cathode as described above, and a bismuth anode, as compared to a conventional double layer capacitor device during the charging cycle. As may be appreciated from a perusal of FIG. 5, the performance of the conventional capacitor is illustrated by line 70, while that for the instant charge storage device is shown by line 72. The performance of the instant device has increasing capacitance with charge stored, which is contrary to that of conventional capacitor devices which demonstrate constant capacitance with charge stored. Hence, the instant device is possesses performance characteristics different than those of conventional capacitors.

Example II

Figure 6:
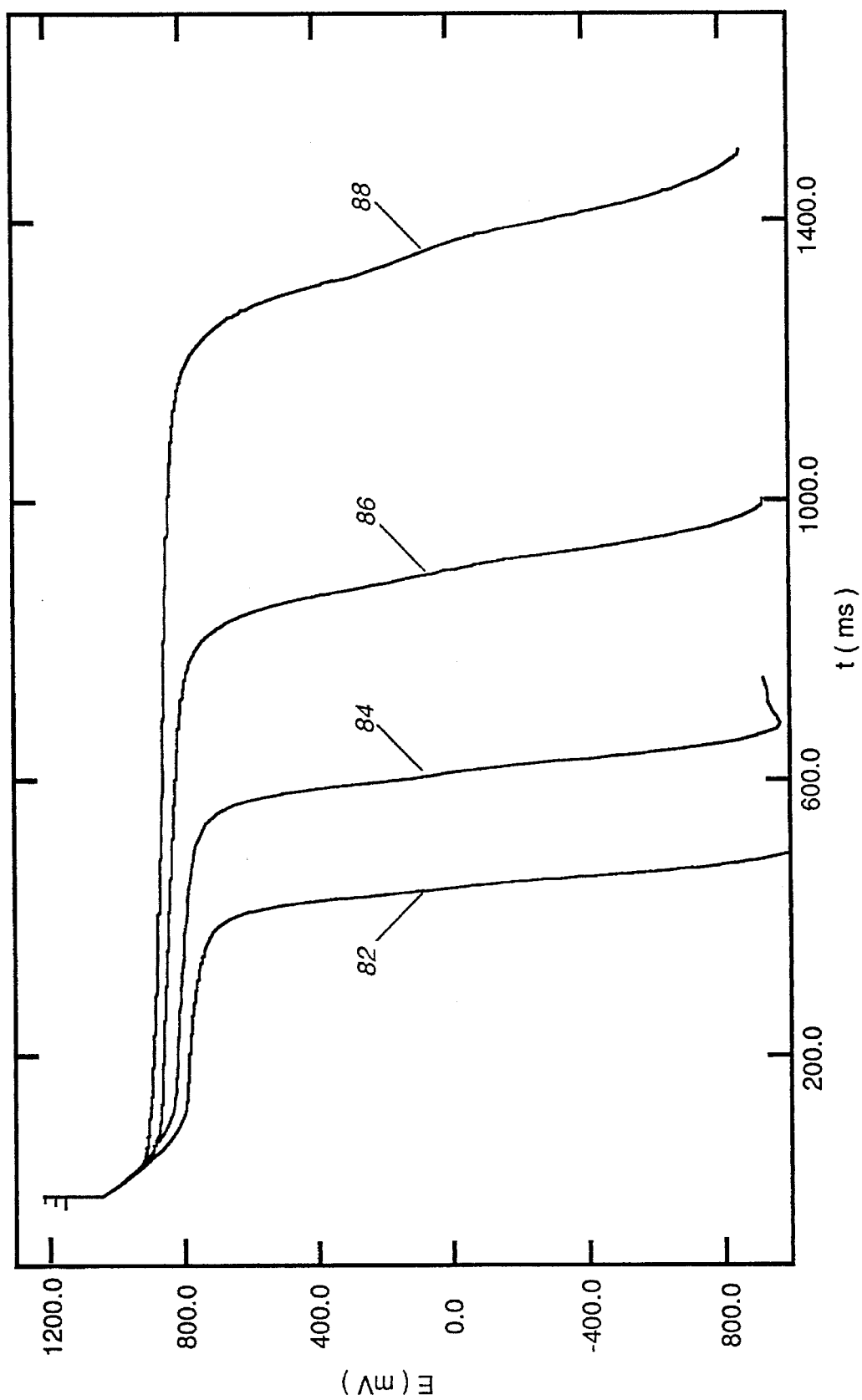
FIG. 6 is a discharge profile for a second electrochemical charge storage device in accordance with the instant invention.

Referring now to FIG. 6, there is illustrated therein the discharge curves for a charge storage device in accordance with the instant invention. The charge storage device was fabricated of a nickel-molybdenum-chromium alloy cathode or positive electrode, which was treated in a 30% KOH solution and polarized. An oxide active material film formed on the nickel-molybdenum-chromium alloy, having a thickness of about 0.20 μm. The anode or negative electrode was fabricated of an antimony:bismuth alloy comprising 90 wt% antimony and 10 wt % bismuth, which was treated in a 30% KOH solution and polarized. An oxide active material film formed on the antimony:bismuth alloy having a thickness of about 0.5 μm. The electrodes were then immersed in an electrolyte solution of 30% KOH, and discharged at various constant discharge currents by means of a potentiostat.

The discharge curve for the charge storage device tested at a constant discharge current of 0.1 A/cm$^2$ is illustrated by line 82, and shows a substantially constant voltage discharge for a discharge period of about 500 milliseconds, corresponding to a C rate of about 7200 C. The discharge curve for the charge storage device tested at a constant discharge current of 0.75 A/cm$^2$ is illustrated by line 84, shows a substantially constant voltage discharge for about a 700 millisecond discharge period corresponding to a C rate of about 5100 C. The discharge curve for the charge storage device tested at a constant discharge current of 0.5 A/cm$^2$ is illustrated by line 86, and shows a very flat, constant voltage discharge for a period of approximately 1.0 seconds, corresponding to a C rate of about 3600 C. Finally, the discharge curve for a charge storage device tested at a constant discharge current of 0.03 A/cm$^2$ is illustrated by line 88, and shows a very flat, constant voltage discharge for a period of approximately 1.5 seconds, corresponding to a C rate of about 2400 C. This sample, like example I illustrates a device capable of discharging stored energy at very fast rates similar to an electrochemical capacitor, while demonstrating a discharge voltage profile which looks similar to that of a battery, thus allowing for a charge storage device having substantially greater utility than current capacitor devices.

Example III

Figure 7:
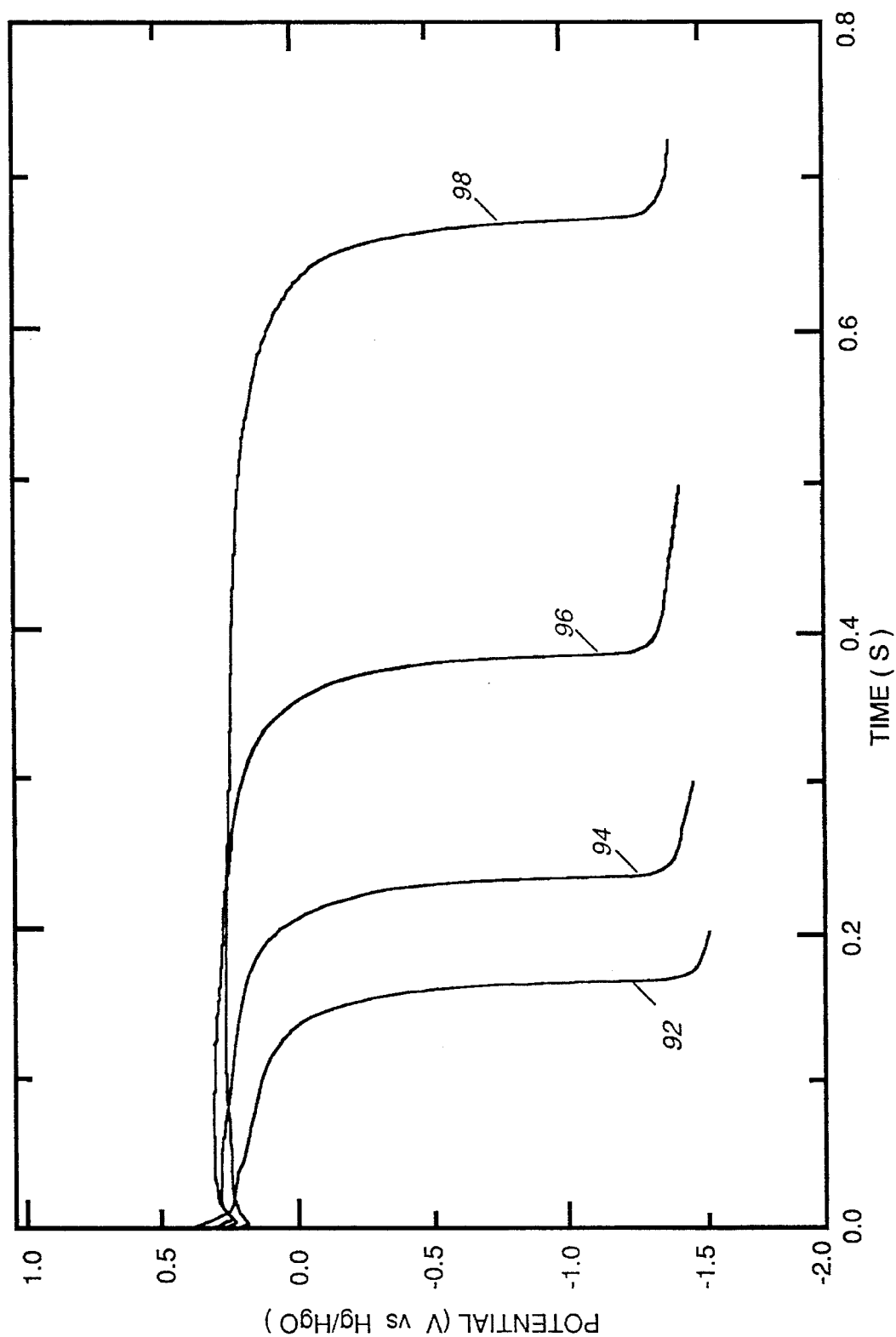
FIG. 7 is a discharge profile for an electrode in accordance with the instant invention.

Referring now to FIG. 7, there is illustrated therein the discharge curves for a charge storage device electrode in accordance with the instant invention. The electrode was fabricated of silver metal having a layer of silver oxide film formed on the surface thereof. The thickness of the oxide layer was approximately 0.1 μm. The electrode was then immersed in an electrolyte solution of 30% KOH, and measured using a Hg/HgO reference electrode at various constant discharge currents. As may be appreciated from a perusal of FIG. 7, the discharge profile of the electrode evaluated therein is substantially constant over the majority of the discharge cycle's duration, at all tested current levels. Further the discharge rates for each test are well in excess of 1000 C.

Specifically, the discharge curve for the silver metal electrode tested at a constant discharge current of 1.59 A/cm$^2$ is illustrated by line 92, and shows a substantially constant voltage discharge, and a C rate in excess of about 9000 C. The discharge curve for the silver metal electrode tested at a constant discharge current of 1.27 A/cm$^2$ is illustrated by line 94, and shows a substantially constant voltage discharge, and a C rate in excess of about 8000 C, while the discharge curve for the silver metal electrode tested at a constant discharge current of 0.95 A/cm$^2$ is illustrated by line 96, and shows a substantially constant voltage discharge, and a C rate in excess of about 7000 C. Finally, the discharge curve for the silver metal electrode tested at a constant discharge current of 0.63 A/cm$^2$ is illustrated by line 98, and shows a very flat, constant voltage discharge for a period of approximately 0.70 seconds, corresponding to a C rate in excess of about 6500 C.

To achieve a desired discharge rate, the series resistance must be kept less than one-tenth of the load value. For example, the cell with the terminal voltage of 1 volt and the capacity of 1 Ah will have a load of 0.1 Ohms for a discharge rate of 10c. Therefore, the internal resistance must be less than 0.01 Ohms. For an internal series resistance of 1/10 of the load, there will be a cell voltage reduction of 10% when the load is applied. This can be seen in the curves of FIGS. 4, 6 and 7 hereinabove at the beginning of the discharge. As the internal series resistance approaches the load resistance, the voltage drop increases to 50%. What this means is 50% of the cell capacity is dissipated in the internal resistance, and not delivered to the load as desired.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrochemical charge storage device having a charge cycle and a discharge cycle, and comprising an anode, a cathode, and an electrolyte, and characterized by a voltage discharge profile which is substantially constant during at least a substantial portion of the discharge cycle under constant current discharge, and a discharge rate in excess of 100 C.

2. An electrochemical charge storage device as in claim 1, wherein said discharge rate is in excess of 1000 C.

3. An electrochemical charge storage device as in claim 1, wherein said voltage discharge profile is constant during at least 80% of the discharge cycle.

4. An electrochemical charge storage device as in claim 1, wherein said anode is less than 10 μm thick.

5. An electrochemical charge storage device as in claim 1, wherein said cathode is less than 10 μm thick.

6. An electrochemical charge storage device as in claim 1, wherein said cathode is fabricated of a nickel-molybdenum-chromium alloy.

7. An electrochemical charge storage device having a charge cycle and a discharge cycle, and comprising an antimony:bismuth alloy anode, a nickel-molybdenum-chromium alloy cathode, and an electrolyte, said charge storage device characterized by a voltage discharge profile which is substantially constant during at least a substantial portion of the discharge cycle under constant current discharge, and a discharge rate in excess of 100 C.

8. An electrochemical charge storage device as in claim 7, wherein said discharge rate is in excess of 1000 C.

9. An electrochemical charge storage device as in claim 7, wherein said voltage discharge profile is constant during at least 80% of the discharge cycle.

10. An electrochemical charge storage device as in claim 7, wherein said anode is less than 10 μm thick.

11. An electrochemical charge storage device as in claim 7, wherein said cathode is less than 10 μm thick.

12. An electrochemical charge storage device having a charge cycle and a discharge cycle, and comprising a zinc alloy anode, a nickel-molybdenum-chromium alloy cathode, and an electrolyte, said charge storage device characterized by a voltage discharge profile which is substantially constant during at least a substantial portion of the charge storage device discharge cycle under constant current discharge, and a discharge rate in excess of 100 C.

13. An electrochemical charge storage device as in claim 12, wherein said discharge rate is in excess of 1000 C.

14. An electrochemical charge storage device as in claim 12, wherein said voltage discharge profile is constant during at least 80% of the discharge cycle.

15. An electrochemical charge storage device as in claim 12, wherein said anode is less than 10 μm thick.

16. An electrochemical charge storage device as in claim 12, wherein said cathode is less than 10 μm thick.

* * * * *